US012134281B2

(12) United States Patent
Nakata et al.

(10) Patent No.: US 12,134,281 B2
(45) Date of Patent: Nov. 5, 2024

(54) WRITING INSTRUMENT

(71) Applicant: MITSUBISHI PENCIL COMPANY, LIMITED, Tokyo (JP)

(72) Inventors: Yusuke Nakata, Tokyo (JP); Hisato Haga, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/593,289

(22) Filed: Mar. 1, 2024

(65) Prior Publication Data

US 2024/0294029 A1  Sep. 5, 2024

(30) Foreign Application Priority Data

Mar. 1, 2023  (JP) ................................. 2023-030906

(51) Int. Cl.
*B43K 8/02* (2006.01)
*C09D 11/17* (2014.01)

(52) U.S. Cl.
CPC ................ *B43K 8/02* (2013.01); *C09D 11/17* (2013.01)

(58) Field of Classification Search
CPC ... B43K 5/02; B43K 7/02; B43K 8/02; C09D 11/17; C09D 11/16; C09D 11/18; C09D 11/017; C09D 11/106; C09D 11/033

USPC ................ 401/198, 199, 222; 523/160, 161; 106/31.6

See application file for complete search history.

(56) References Cited

U.S. PATENT DOCUMENTS

| | | | |
|---|---|---|---|
| 11,505,709 B2* | 11/2022 | Kawata | B41M 5/0023 |
| 11,560,489 B2 | 1/2023 | Haga | |
| 11,718,758 B2* | 8/2023 | Haga | C09D 7/41 524/544 |
| 2020/0347251 A1 | 11/2020 | Haga | |

FOREIGN PATENT DOCUMENTS

| | | |
|---|---|---|
| JP | 2019-112561 A | 7/2019 |
| JP | 2021-185024 A | 12/2021 |
| WO | WO 2019/189364 A1 | 10/2019 |

* cited by examiner

*Primary Examiner* — David J Walczak
(74) *Attorney, Agent, or Firm* — Oblon, McClelland, Maier & Neustadt, L.L.P.

(57) ABSTRACT

A writing instrument may be capable of preventing dye deposition to a pen core and highly achieving both inhibition of ink discoloration due to the dye deposition and improved writing feeling without reducing writing performance. Such a writing instrument may be equipped with a pen core and loaded with a water-based ink composition, wherein the water-based ink composition contains colored resin particles formed by polymerization of a monomer comprising at least cyclohexyl (meth)acrylate, enclosing a basic dye, an oil-soluble dye or an acid dye, and further contains an anionic surfactant.

18 Claims, 13 Drawing Sheets

WRITING INSTRUMENT

CROSS-REFERENCE TO RELATED APPLICATIONS

The present application claims the benefit of the filing date of Japanese Appl. No. 2023-030906, filed on Mar. 1, 2023, the content of each of which is incorporated by reference.

TECHNICAL FIELD

The present invention relates to a writing instrument loaded with an aqueous ink composition containing colored resin particles colored with a dye.

BACKGROUND ART

Aqueous ink compositions containing as a colorant resin particles colored with a dye, and writing instruments and applicators loaded with such an aqueous ink composition have been known in the art.

Known examples include:
(1) an applicator including:
   an aqueous ink containing at least:
      colored resin particles colored with a dye, and
      wax particles having an average particle size of 5% or greater and 95% or less of an average particle size of the colored resin particles, and
   a fiber bundle as an applicator tip (pen core) (see, e.g., Patent Document 1); and
(2) a dispersion of colored resin fine particles for an aqueous ink, in which the colored resin fine particles are dispersed in water, the colored resin fine particles containing:
   a cyclohexyl (meth)acrylate monomer, and
   a basic dye or an oil-soluble dye, in which
      a content of the cyclohexyl (meth)acrylate monomer is 30 mass % or more relative to the total amount of polymer components forming the colored resin fine particles, and
      a content of the basic dye or the oil-soluble dye is 15 mass % or more relative to the total amount of polymer components; and an aqueous ink composition for a writing instrument, the composition containing this dispersion (see, e.g., Patent Document 2, which is a preceding application of the present applicant).

However, r loaded with the aqueous ink composition described in Patent Document 1 has been associated with problems, such as deposition of the dye contained in the ink to the fiber bundle over time, and ink discoloration due to the dye deposition. Furthermore, dye deposition to the pen core causes problems; for example, it is more likely to cause a change in hue of a drawn line compared with that of a line initially drawn, and this problem tends to be more evident as the storage period is longer.

A writing instrument loaded with the aqueous ink composition of Patent Document 2 has unprecedentedly excellent writing performance, but further improvements in performance are desired, such as prevention of dye deposition to the pen core, inhibition of ink discoloration due to the dye deposition, and improved writing feeling.

Furthermore, a pen core composed of a plastic core gives a hard writing touch and a feeling of being caught, although this depends on the compatibility with the ink. Thus, a further improvement in writing feeling is desired.

Meanwhile, the present applicant has disclosed another writing instrument (see, e.g., Patent Document 3). To prevent ink discoloration caused by adsorption of a coloring material of an ink for a writing instrument on the pen tip, this writing instrument is loaded with an aqueous ink composition containing an aqueous dispersion of colored particles composed of a polymer having at least a monomer unit derived from a dye having a polymerizable unsaturated group, and a pen tip (excluding a sintered core) is composed of a polyester-based material. This writing instrument solves problems in the same manner as in the present invention but is different from the present invention in technical ideas (such as the configuration and its operation effects).

CITATION LIST

Patent Document
Patent Document 1: WO 2019/189364 (e.g., Claims, Examples)
Patent Document 2: JP 2019-112561 A (e.g., Claims, Examples)
Patent Document 3: JP 2021-185024 A (e.g., Claims, Examples)

SUMMARY OF INVENTION

Technical Problem

In view of the above problems known in the art and current statuses, the present invention is to solve these problems, and an object of the present invention is to provide a writing instrument loaded with an aqueous ink composition containing resin particles colored with a dye as a colorant, the writing instrument capable of preventing dye deposition to a pen core and highly achieving both inhibition of ink discoloration due to the dye deposition and improved writing feeling without impairing writing performance.

Solution to Problem

As a result of diligent research in view of the above problems in the art, the present inventors have found that the above object can be achieved by such a writing instrument loaded with an aqueous ink composition containing at least colored resin particles and a specific component, the colored resin particles made from a monomer containing a cyclohexyl (meth)acrylate, and containing a basic dye, an oil-soluble dye, or an acid dye, and have completed the present invention.

That is, the present invention is a writing instrument equipped with a pen core and loaded with a water-based ink composition, the water-based ink composition containing colored resin particles being formed by polymerization of a monomer comprising at least cyclohexyl (meth)acrylate and enclosing a basic dye, an oil-soluble dye or an acid dye, and containing an anionic surfactant.

The anionic surfactant is preferably at least one selected from a sulfonic acid-based surfactant, a sulfate ester-based surfactant, a phosphate ester-based surfactant, or a carboxylic acid-based surfactant. The material of a pen core of the writing instrument is preferably at least one selected from Group A below:
   Group A: a polyester core, an acrylic core, a nylon core, a poly(butylene terephthalate) (PBT) core, a polyethylene core, a rubber core, a urethane core, a polyacetal (POM) core, a polypropylene (PP) core, a poly(ethylene naphthalate) (PEN) core, and a poly(ethylene terephthalate) (PET) core.

Advantageous Effects of Invention

According to the present invention, there is provided a writing instrument capable of preventing dye deposition to a pen core and highly achieving both inhibition of ink discoloration due to the dye deposition and improved writing feeling without impairing writing performance.

The object and effects of the present invention can be recognized and obtained especially by using the components and combinations indicated in claims. Both of the aforementioned general description and the following detailed description are exemplary and explanatory and do not limit the present invention described in claims.

DESCRIPTION OF EMBODIMENTS

Figure 1A:
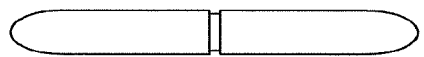
FIGS. 1A to 1N are explanatory diagrams illustrating the structures of pen cores composed of fiber cores in the writing instrument of the present invention.
Figure 1B:
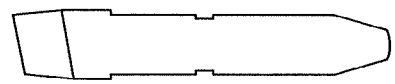
Figure 1C:
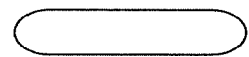
Figure 1D:
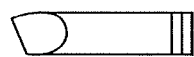
Figure 1E:
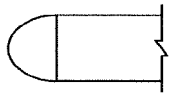
Figure 1F:
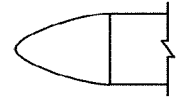
Figure 1G:
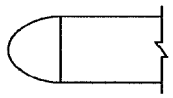
Figure 1H:
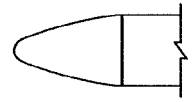
Figure 1I:
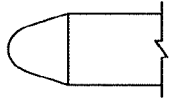
Figure 1J:
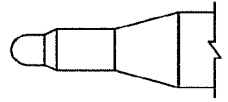
Figure 1K:
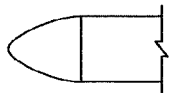
Figure 1L:
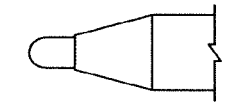
Figure 1M:
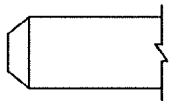

Embodiments of the present invention will be described in detail below. However, it should be noted that the technical scope of the present invention is not limited to the respective embodiments described in detail below and encompasses the invention described in Claims and equivalents of the invention.

The writing instrument of the present invention is loaded with an aqueous ink composition containing at least:
colored resin particles containing:
a cyclohexyl (meth)acrylate monomer, and a basic dye, an oil-soluble dye, or an acid dye; and an anionic surfactant.

Aqueous Ink Composition; Colored Resin Particles

The aqueous ink composition to be loaded into the writing instrument of the present invention will be described in detail below.

The aqueous ink composition is formed by polymerization of a monomer containing at least (meth) cyclohexyl acrylate and contains a basic dye, an oil-soluble dye or an acid dye.

The cyclohexyl (meth)acrylate monomer to be used is selected from the viewpoints that stable colored resin fine particles with excellent dark color development are obtained if the amount of the dye to be incorporated is increased, and the resulting colored resin fine particles provide a sufficient density in a drawn line as a coloring material for a writing instrument.

The description "(meth) acrylic acid" represents "acrylic acid and/or methacrylic acid". As a conventional method of producing the cyclohexyl (meth)acrylate monomer, used is an esterifying method of esterifying (meth) acrylic acid and cyclohexanol using a catalyst, such as an inorganic acid, an organic sulfonic acid, or a strong acid ion-exchange resin, or a transesterification method using an organic metal compound containing titanium or tin as a catalyst.

In the present invention, in addition to the cyclohexyl (meth)acrylate monomer, a hydrophobic vinyl monomer other than the cyclohexyl (meth)acrylate monomer, or an aqueous monomer can be preferably used from the viewpoint of obtaining colored resin fine particles with excellent color developability.

Examples of the hydrophobic vinyl monomer that can be used include esters of acrylic acid or methacrylic acid other than the cyclohexyl (meth)acrylate monomer; styrene or methylstyrene alone or a mixture of the two or more.

Examples of the hydrophobic vinyl monomer that can be used include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, palmityl (meth)acrylate, stearyl (meth)acrylate, behenyl (meth)acrylate, styrene, or methylstyrene alone or a mixture of the two or more.

Examples of the aqueous monomer that can be used include glycerin monomethacrylate, sodium 2-sulfoethyl methacrylate, polyethylene glycol monomethacrylate, polypropylene glycol monomethacrylate, polyethylene glycol-propylene glycol monomethacrylate, polyethylene glycol-tetramethylene glycol-monomethacrylate, or propylene glycol-polybutylene glycol-monomethacrylate each individually or a mixture of the two or more.

Examples of the basic dye that can be used include di- or triarylmethane dyes; quinoneimine dyes, such as azine dyes (including nigrosine), oxazine dyes, or thiazine dyes; xanthene dyes; triazoleazo dyes; thiazoleazo dyes; benzothiazoleazo dyes; azo dyes; methine dyes, such as polymethine dyes, azomethine dyes, or azamethine dyes; anthraquinone dyes; or phthalocyanine dyes each individually or a mixture of the two or more. A water-soluble basic dye is preferred.

Specific examples of the basic dye that can be used include various dyes of the numbers described in COLOR INDEX, such as C.I. Basic Yellow (e.g., -1, -2, -9, -40, -80), C.I. Basic Orange (e.g., -1, -2, -7, -34), C.I. Basic Red (e.g., -1, -1:1, -2, -3, -14, -53), C.I. Basic Violet (e.g., -1, -2, -3, -11:1, -39), C.I. Basic Blue (e.g., -1, -2, -5, -7, -88), C.I. Basic Green (e.g., -1, -4, -6, -10), C.I. Basic Brown (e.g., -1, -2, -4, -15), and C.I. Basic Black (e.g., -1, -2, -7, -8).

In addition, commercially available products of these can also be used, and examples include yellow basic dyes, such as AIZEN CATHILON YELLOW GLH (trade name, available from Hodogaya Chemical Co., Ltd.); red basic dyes, such as AIZEN CATHILON RED BLH and AIZEN CATHILON RED RH (trade names, available from Hodogaya Chemical Co., Ltd.), Diacryl Supra Brilliant Red 2G (trade name, available from Mitsubishi Chemical Corporation), and Sumiacryl Red B (trade name, available from Sumitomo Chemical Co., Ltd.); blue basic dyes, such as AIZEN CATHILON TURQUOISE BLUE LH (trade name, available from Hodogaya Chemical Co., Ltd.); green basic dyes, such as Diacryl Supra Brilliant Green 2GL (trade name, available from Mitsubishi Chemical Corporation); and brown basic dyes, such as Janus Brown R (trade name, available from Japan Chemical Co., Ltd.) and AIZEN CATHILON BROWN GH (trade name, available from Hodogaya Chemical Co., Ltd.).

In addition, examples of the acid dye to be used in the present invention include C.I. Acid Black 1, C.I. Acid Black 2, Acid Black 52, C.I. Acid Yellow 3, C.I. Acid Yellow 7, C.I. Acid Yellow 23, C.I. Acid Yellow 42, C.I. Acid Red 18, C.I. Acid Red 51, C.I. Acid Red 52, C.I. Acid Red 87, C.I. Acid Red 92, C.I. Acid Red 289, C.I. Acid Orange 10, C.I. Acid Green 3, C.I. Acid Green 16, C.I. Acid Blue 1, C.I. Acid Blue 9, C.I. Acid Blue 22, C.I. Acid Blue 90, C.I. Acid Blue 239, C.I. Acid Blue 248, C.I. Acid Violet 15, C.I. Acid Violet 49, Acid Red 52, Acid Red 289, Acid Red 388, Acridine Red (C.I. 45000), Rhodamine 110, Rhodamine 123, Rhodamine 6G (C.I. Basic Red 1), Rhodamine 6G Extra, Rhodamine 116, (C.I. Rhodamine B 45170), tetramethylrhodamine perchlorate salt, Rhodamine 3B, Rhodamine 19, sulforhodamine, Pyronin G (C.I. 45005), Rhodamine 3GO (C.I. 45215), Sulforhodamine G, Rhodamine S (C.I. 45050), Rhodamine G (C.I. 45150), Ethylrhodamine B (C.I. 45175), and Rhodamine 4G (C.I. 45166).

In addition, examples of the oil-soluble dye to be used in the present invention include commonly commercially available monoazo dyes, disazo dyes, metal complex type monoazo dyes, anthraquinone dyes, phthalocyanine dyes, and triarylmethane dyes. Furthermore, a halochromic oil-soluble dye obtained by replacing a functional group of an acid or basic dye with a hydrophobic group can also be used.

Examples of the oil-soluble dye include yellow dyes, such as C.I. Solvent Yellow 16, 18, 29, 30, 33, 56, 79, 82, 93, 98, 114, 116, and 162; orange dyes, such as C.I. Solvent Orange 22, 62, and 67; red dyes, such as C.I. Solvent Red 1, 8, 18, 49, 122, 127, 132, 146, 195, and 218; blue dyes, such as C.I. Solvent Blue 5, 36, 38, 44, 63, 70, 83, 105, and 111; and black dyes, such as C.I. Solvent Black 3, 5, 7, 27, 29, and 34. Specific examples of commercially available oil-soluble dyes include blue dye SBN Blue 701 (available from Hodogaya Chemical Co., Ltd.), blue dye Oil Blue 650 (available from Orient Chemical Industries Co., Ltd.), blue dye Savinyl Blue GLS (available from Clariant AG), red dye SOC-1-0100 (available from Orient Chemical Industries Co., Ltd.), OIL BLACK 860, OIL PINK 314, OIL YELLOW 3G, VALIFAST PINK 2310N, VALIFAST RED 3312, VALIFAST YELLOW CGHN new, VALIFAST YELLOW 1108, and VALIFAST BLACK 3830 (available from Orient Chemical Industries Co., Ltd.).

The colored resin fine particles to be used in the present invention include colored resin fine particles dispersed in water, wherein the colored resin fine particles are formed by polymerization a monomer comprising at least a cyclohexyl (meth)acrylate and are enclosing a basic dye, an oil-soluble dye, or an acid dye. The colored resin fine particles can be produced by, for example, a production method involving dissolution of a basic dye, an oil-soluble dye or an acid dye in cyclohexyl (meth)acrylate monomer or a mixed monomer containing cyclohexyl (meth)acrylate monomer and a hydrophobic vinyl monomer other than the cyclohexyl (meth)acrylate monomer; and emulsion polymerization of the monomer using a polymerization initiator such as ammonium persulfate, potassium persulfate, or hydrogen peroxide or using a reducing agent in combination with the polymerization initiator, and further using a cross-linker, such as triallyl isocyanurate, triallyl isocyanurate, polyethylene glycol dimethacrylate, polypropylene glycol dimethacrylate, pentaerythritol acrylate, ditrimethylolpropane acrylate, dipentaerythritol acrylate, methoxylated bisphenol A methacrylate, pentaerythritol methacrylate, ditrimethylolpropane methacrylate, dipentaerythritol methacrylate, or ethoxylated polyglycerol methacrylate, and as necessary a polymerizable surfactant (emulsifier), such as ammonium polyoxyethylene-1-(allyloxymethyl)-alkyl ether sulfate, ether sulfate, ammonium polyoxyethylene nonyl propenyl phenyl ether sulfate, polyoxyethylene nonyl propenyl phenyl ether, ammonium polyacrylate, styrene-maleic acid copolymer ammonium, polyoxyethylene alkyl ether, polyoxyethylene styrenated phenyl ether, polyoxyethylene polyoxypropylene glycol, polyoxyalkylene decyl ether, polyoxyethylene tridecyl ether, an alkyl benzene sulfonate salt, a dioctyl sulfosuccinate salt, sodium lauryl sulfate, polyoxyethylene alkyl ether phosphate ester, polyoxyethylene styrenated phenyl ether phosphate ester, polyoxyethylene styrenated phenyl ether sulfate salt, or polyoxyethylene alkyl ether sulfate salt. Although the above-described dyeing is carried out simultaneously with the polymerization, the dyeing may be carried out by dissolving the basic dye, the oil-soluble dye, or the acid dye after the polymerization.

The use of the cross-linker such as triallyl isocyanurate is preferred, since the cross-linker can improve the heat resistance, mechanical properties, hydrolysis resistance, and weather resistance of the colored resin fine particles.

In the present invention, the emulsion polymerization may be carried out with further mixing of an appropriate amount of a dicyclopenta(te)nyl (meth)acrylate monomer with, for example, the cyclohexyl (meth)acrylate monomer described above. The colored resin fine particles obtained by emulsion polymerization with further mixing of the dicyclopenta(te)nyl (meth)acrylate monomer have stability less likely to be impaired even if a moisture in the dispersion is volatilized, and this results in obtaining a dispersion of the colored resin fine particles for an aqueous ink with excellent stability.

Examples of the dicyclopenta(te)nyl (meth)acrylate monomer that can be used include a dicyclopentanyl acrylate monomer, dicyclopentenyl acrylate, a dicyclopentanyl methacrylate monomer, and dicyclopentenyl methacrylate.

In the present invention, during the emulsion polymerization, the cross-linking may be carried out by blending an appropriate amount of a monomer having a reactive cross-linking group, such as an epoxy group, a hydroxymethylamide group, or an isocyanate group, or a polyfunctional monomer having two or more vinyl groups in addition to the cyclohexyl (meth)acrylate monomer, the hydrophobic vinyl monomer other than the cyclohexyl (meth)acrylate monomer, and the dicyclopenta(te)nyl (meth)acrylate monomer.

In the present invention, among the polymer components forming the colored resin fine particles, the content of the cyclohexyl (meth)acrylate monomer needs to be 30 mass % or more relative to the total amount of polymer components forming the colored resin fine particles, and is preferably 30 to 95 mass % and more preferably 30 to 70 mass %.

In the present invention, "polymer components" refers to all of the polymerizable components forming the colored resin fine particles, and specifically refers to cyclohexyl (meth)acrylate monomer, an additional monomer component, and a cross-linker to be used.

The content of the cyclohexyl (meth)acrylate monomer is preferably 30 mass % or more relative to the total amount of polymer components, and in this case, the effects of the present invention can be achieved. Meanwhile, when the content is less than 30 mass %, the stability over time may be impaired.

Among the polymer components forming the colored resin fine particles, the content of an additional monomer component other than the cyclohexyl (meth)acrylate monomer is the balance of the total amount of polymer components including the total amount of the cyclohexyl (meth)acrylate monomer and the cross-linker to be used.

The content of the additional monomer component is preferably 5 to 85 mass % relative to the total amount of polymer components, from the viewpoints of further achieving the effects of the present invention, dispersibility, and reactivity.

In the present invention, the content of the basic dye, the oil-soluble dye, or the acid dye needs to be preferably 15 mass or more, and is preferably 15 to 50 mass, and more preferably 15 to 40 mass % relative to the total amount of polymer components, from the viewpoints of color developability, obtaining a sufficient drawn line density, and stability.

The dye contained in an amount of 15% or more enables the colored resin fine particles to exhibit sufficient color developability and a sufficient drawn line density. Meanwhile, when the content of the dye is less than 15 mass %, the colored resin fine particles may fail to exhibit sufficient color developability, and thus the effects of the present invention cannot be achieved.

The polymerizable surfactant that can be used as necessary is not particularly limited as long as it is a polymerizable surfactant typically used in the emulsion polymerization. For example, the polymerizable surfactant is an anionic or nonionic polymerizable surfactant, and examples include ADEKA REASOAP NE-10, NE-20, NE-30, NE-40, or SE-10N available from ADEKA Corporation; LATEMUL S-180, S-180A, or S-120A available from Kao Corporation; ELEMINOL JS-20 available from Sanyo Chemical Industries, Ltd.; or AQUALON KH-05, KH-10, HS-10, AR-10, or RN-10 available from DKS Co., Ltd. The amount of the polymerizable surfactant to be used is 0 to 50 mass % and preferably 0.1 to 50 mass % relative to the total amount of the monomers.

In addition, the content of the cross-linker, such as triallyl isocyanurate, is 0 to 50 mass % and preferably 0.1 to 25 mass % relative to the total amount of the monomers.

In the present invention, a dispersion of colored resin fine particles in which the colored resin fine particles as a resin solid content are dispersed in an amount of 20 to 50 mass % in water is obtained by dissolving the basic dye, the oil-soluble dye, or the acid dye described above in the monomer containing at least the cyclohexyl (meth)acrylate, and emulsion-polymerizing the monomer; or by polymerizing a mixed monomer containing at least the cyclohexyl (meth)acrylate monomer and an additional monomer component followed by dissolving the basic dye or the oil-soluble dye to dye the polymer. This dispersion may be used as is as an aqueous ink composition for a writing instrument, or may be dried to give colored resin fine particles to be used.

The colored resin fine particles serve as a coloring material having excellent functions, such as sufficient color developability and excellent stability over time more than ever in the art, and is useful as a coloring material for an aqueous ink composition suitable for writing instruments, such as felt-tip pens, marking pens, and ballpoint pens.

In the present invention, an average particle size of the colored resin fine particles varies depending on, for example, the cyclohexyl (meth)acrylate monomer, the type of the additional monomer to be used, the contents of the monomers, and the polymerization conditions during the polymerization, but is preferably 20 to 300 nm, more preferably 40 to 150 nm, and even more preferably 60 to 110 nm.

When the average particle size falls within the preferred range described above, the colored resin fine particles do not clog a pen core of a writing instrument, such as a felt-tip pen, a marking pen, or a ballpoint pen, and further exhibit excellent storage stability.

The "average particle size" specified in the present invention is a histogram average particle size by scattered light intensity distribution. In the present invention (including Examples described below), the average particle size is a value of $D_{50}$ measured with a particle size distribution measuring apparatus [FPAR1000 (available from Otsuka Electronics Co., Ltd.)].

Aqueous Ink Composition; Anionic Surfactant

The aqueous ink composition of the present invention contains at least the colored resin particles composed as described above and the anionic surfactant described below.

The anionic surfactant to be used in the present invention is incorporated for further improving writing feeling, preventing dye deposition to the pen core due to the use of the colored resin particles, and inhibiting ink discoloration due to the dye deposition.

In the present invention, the surfactant used is limited to the anionic surfactant. The reason for this is to increase the dispersion stability without being affected by the type and content of the dye incorporated in the colored resin particles. For example, when a nonionic surfactant, such as polyoxyethylene lauryl ether is used, the effects of the present invention cannot be achieved.

Examples of the anionic surfactant that can be used include a sulfate ester-based (R—O—SO$_3^-$M$^+$) surfactant, a sulfonic acid-based (R—SO$_3^-$M$^+$) surfactant, a phosphate ester-based (R—O—PO(OH)OM$^+$) surfactant, and a carboxylic acid-based (R—COO-M$^+$) surfactant.

Among the phosphate ester-based surfactants having an HLB value, a surfactant having an HLB of 13 or less (HLB≤13), more preferably 5 to 12, and particularly preferably 6 to 11 is desired to be used from the viewpoint of inhibiting discoloration of the pen core, and the stability of the ink over time.

The "HLB value" in the present invention is calculated by the Kawakami method [HLB value=7+11.7 log (MW/MO), MW: total sum of formula weights of hydrophilic moieties, MO: total sum of formula weights of lipophilic moieties].

Examples of the sulfate ester-based surfactant include higher alcohol sulfate ester salts, alkyl sulfate salts, polyoxyethylene alkyl ether sulfate esters, polyoxyethylene alkyl sulfate aryl esters, polyoxyethylene alkyl phenyl ether sulfate esters, sulfate esters of polymers of polyoxyethylene alkyl phenyl ether, polyoxyethylene benzyl phenyl ether sulfate esters, polyoxyethylene styryl phenyl ether sulfate esters, sulfate esters of polymers of polyoxyethylene styryl phenyl ether, sulfate esters of polyoxyethylene polyoxypropylene block polymers, sulfated olefins, and their salts.

Examples of the salt (M) of each of the compounds described above include metal salts (such as Na, K, Ca, Mg, and Zn salts), ammonium salts, alkanolamine salts, and aliphatic amine salts. (Hereinafter, the same shall apply to sulfonic acid-based, phosphate ester-based, and carboxylic acid-based surfactants.)

One of these compounds can be used alone, or a plurality of these can be used in combination (hereinafter referred to as "at least one").

Among these, at least one of an alkyl sulfate ester salt or a polyoxyalkylene alkyl ether sulfate ester salt can be preferably used.

The alkyl sulfate ester salt is suitably an alkyl sulfate ester salt having an alkyl group having 8 or more, preferably 10 or more, and 20 or less, preferably 18 or less, more preferably 14 or less carbons, and further having a linear or branched alkyl group.

The polyoxyalkylene alkyl ether sulfate is suitably a polyoxyalkylene alkyl ether sulfate having an alkyl group having 8 or more, preferably 10 or more, and 20 or less, preferably 18 or less, more preferably 14 or less carbons, and further having a linear or branched alkyl group, in which an average addition mole number of an oxyalkylene group having 2 or more and 3 or less carbons is preferably 0.1 or more, more preferably 0.3 or more, even more preferably 0.4 or more, and preferably 6 or less, more preferably 3 or less, even more preferably 1.5 or less. The oxyalkylene group preferably has 2 carbons.

Examples of the sulfate ester-based surfactant that can be specifically used include sodium lauryl sulfate, sodium polyoxyalkylene lauryl ether sulfates, polyoxyethylene alkyl aryl sulfate esters, and alkyl sulfate salts. Examples of commercially available products include EMAL 2FG, EMAL 270J, and EMAL D-4-D (all available from Kao Corporation), Sannol EH-1145M, Sannol IM-1130, and Sannol LM-1140T (all available from Lion Corporation), an alkanolamide surfactant (a mixture of propylene glycol with a mixture of ethanolamine and triethanolamine; available from Helena), Monogen Y-100 (available from DKS Co. Ltd.), and TRADER Pro (trade name, a mixture with magnesium sulfate; available from Comtorir Commercial Des Lubrifiants).

Among these, sodium lauryl sulfate or sodium polyoxyalkylene lauryl ether sulfate is preferred.

Examples of the sulfonic acid-based surfactant that can be used include at least one of alkylbenzenesulfonic acid, dialkylsulfosuccinic acid, alkyl diphenyl ether disulfonic acid, α-olefin sulfonic acid, polyoxyethylene alkyl phenyl ether sulfonic acid, polyoxyethylene alkyl ether sulfosuccinic naphthalenesulfonic acid and alkylnaphthalenesulfonic acid, dodecylbenzenesulfonic acid, polyoxyethylene alkyl aryl sulfonic acid, naphthalenesulfonic acid-formalin condensate, or salts of these.

Examples of the sulfonic acid-based surfactant that can be specifically used include alkylsulfonic acid, alkylbenzenesulfonic acid, alkylnaphthalenesulfonic acid, alkyl diphenyl ether disulfonic acid, alkylmethyltaurine, sulfosuccinic acid diester, polyoxyalkylene alkyl ether sulfonic acid; and of these, such as sodium salts dodecylbenzenesulfonate, sodium alkyl diphenyl disulfonate, and sodium β-naphthalenesulfonate-formalin condensate; and commercially available products, such as Neopelex G-25 and Pelex SSL (all available from Kao Corporation).

Among these, sodium dodecylbenzenesulfonate, sodium alkyl diphenyl disulfonate, or sodium β-naphthalenesulfonate-formalin condensate is preferred.

Examples of the phosphate ester-based surfactant that can be used include phosphate monoesters of a polyoxyethylene alkyl ether or a polyoxyethylene alkyl aryl ether, phosphate diesters of a polyoxyethylene alkyl ether or a polyoxyethylene alkyl aryl ether, phosphate triesters of a polyoxyethylene alkyl ether or a polyoxyethylene alkyl aryl ether, alkyl phosphate esters, alkyl ether phosphate esters, or salts of these, and their derivatives. Examples of the alkyl group of the phosphate ester-based surfactant include a styrenated phenol-based, nonylphenol-based, octylphenol-based, or linear alcohol-based alkyl group.

Examples of the phosphate ester-based surfactant that can be specifically used include polyoxyethylene oleyl ether phosphate, polyoxyethylene lauryl ether phosphate, polyoxyethylene alkyl ether phosphate, polyoxyethylene styrenated phenyl ether phosphate, alkyl phosphate ester, or salts of these. Examples of commercially available products include Phosphanol RB-410 (HLB: 8.6), RD-510Y (HLB: 9.9), RS610 (HLB: 10.5), RS-710 (HLB: 13.3), and ML-220 (all available from Toho Chemical Industry Co., Ltd.), Plysurf AL, AL-H, and A-212C (all available from DKS Co. Ltd.), NIKKOL DLP-10 (available from Nikko Chemicals Co., Ltd.), and AP-1 and MP-4 (all available from Daihachi Chemical Industry Co., Ltd.).

Among these, polyoxyethylene oleyl ether phosphate, polyoxyethylene lauryl ether phosphate, polyoxyethylene alkyl ether phosphate, polyoxyethylene styrenated phenyl ether phosphate, or salts of these are preferred.

Examples of the carboxylic acid-based surfactant include a fatty acid or its salt, a polyvalent carboxylic acid or its salt, a polyoxyalkylene alkyl ether carboxylic acid or its salt, a polyoxyalkylene alkylamide ether carboxylic acid or its salt, rosin acid or its salt, a dimer acid or its salt, a polymer acid or its salt, and a tall oil fatty acid or its salt.

For the fatty acid, either a saturated fatty acid or an unsaturated fatty acid can be used. A fatty acid or its salt having 3 to 18 carbons is preferably used, and a fatty acid or its salt having 3 to 16 carbons is more preferably used. Specific examples of preferred fatty acids include propionic acid, butanoic acid, pentanoic acid, hexanoic acid, heptanoic acid, octanoic acid, decanoic acid, lauric acid, myristic acid, palmitic acid, or stearic acid.

Examples of the carboxylic acid-based surfactant that can be specifically used include a fatty acid and an unsaturated fatty acid or their salts, a polyvalent carboxylic acid or its salt, a polyoxyalkylene alkyl ether carboxylic acid or its salt, a polyoxyalkylene alkylamide ether carboxylic acid or its salt, rosin acid or its salt, a dimer acid or its salt, a polymer acid or its salt, and a tall oil fatty acid or its salt. Specific examples include sodium lauryl ether carboxylate, sodium N-lauroylsarcosine, sodium N-lauroyl glutamate, and N-lauroyl-N-methyl-β-alanine salt.

Among these, a polyoxyalkylene alkyl ether carboxylic acid or its salt, or a polyoxyalkylene alkylamide ether carboxylic acid or its salt is preferred.

Among these anionic surfactants, sulfate ester-based (R—O—$SO_3^-M^+$), sulfonic acid-based (R—$SO_3^-M^+$), and phosphate ester-based (R—O—$PO(OH)OM^+$) surfactants are preferred. More preferably, the compound specifically described above (including the commercially available products described above) are used.

The content of the anionic surfactant is preferably 0.1 to 10 mass %, more preferably 0.5 to 7 mass %, and particularly preferably 1 to 5 mass % relative to the amount of the entire aqueous ink composition, from the viewpoint of dispersion stability.

When the content is 0.1 mass % or more, the anionic surfactant can prevent adsorption of the dye onto a pen core and can inhibit discoloration of the pen core and a drawn line. Meanwhile, when the content is 10 mass % or less, bleeding and deterioration of strike-through resistance can be prevented, and storage stability can be maintained.

Aqueous Ink Composition; Additional Component

The aqueous ink composition of the present invention contains at least the colored resin particles composed as described above and the anionic surfactant, and preferably further contains water-soluble organic solvent and water.

Examples of the water-soluble organic solvent that can be used include an alkylene glycol, such as ethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, or 1,2,3-hexanetriol; a polyalkylene glycol, such as polyethylene glycol or polypropylene glycol; a glycerol, such as glycerol, diglycerol, or triglycerol; a lower alkyl ether of glycol, such as ethylene glycol monomethyl ether, ethylene glycol monoethyl ether, diethylene glycol monomethyl ether, diethylene glycol monoethyl ether, or diethylene glycol mono-n-butyl ether; N-methyl-2-pyrrolidone; or 1,3-dimethyl-2-imidazolidinone.

Additionally, a water-soluble solvent, for example, an alcohol such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol, or benzyl alcohol, an amide such as dimethylformamide or diethylacetamide, or a ketone such as acetone, can also be mixed.

The content of such a water-soluble organic solvent varies depending on the type of writing instrument, such as a felt-tip pen, a marking pen, or a ballpoint pen, and is 1 to 40 mass % relative to the amount of the entire ink composition.

The content of water (such as tap water, purified water, ion-exchanged water, distilled water, or pure water) is preferably 30 to 90 mass % and more preferably 40 to 60 mass % relative to the amount of the entire aqueous ink composition.

The content of the colored resin particles varies depending on the type of writing instrument, and the outflow mechanism (a pen core, a ballpoint pen), and is preferably 1 to 30 mass % in terms of solid content relative to the amount of the entire aqueous ink composition.

In the aqueous ink composition to be loaded into the writing instrument of the present invention, a preservative or a fungicide, a pH adjuster, a defoamer, or a colorant for complementary color can also be appropriately selected and used as necessary, so long as such an additive does not impair the effects of the present invention.

Examples of the pH adjuster include ammonia, urea, monoethanolamine, diethanolamine, triethanolamine, aminomethylpropanol, an alkali metal salt of carbonic acid or phosphoric acid, such as sodium tripolyphosphate or sodium carbonate, or a hydroxide of an alkali metal, such as sodium hydroxide.

Examples of the preservative or fungicide include phenol, sodium omadine, sodium pentachlorophenol, 1,2-benzisothiazolin-3-one, 2,3,5,6-tetrachloro-4-(methylsulfonyl) pyridine, an alkali metal salt of benzoic acid, sorbic acid, or dehydroacetic acid, or a benzimidazole-based compound.

Examples of the lubricant include phosphate esters; polyalkylene glycol derivatives, such as polyoxyethylene lauryl ether; fatty acid alkali salts; nonionic surfactants; fluorinated surfactants, such as perfluoroalkyl phosphate esters; or polyether-modified silicones, such as polyethylene glycol adducts of dimethylpolysiloxane.

Furthermore, a non-drying agent may be incorporated for preventing the drying of the pen tip, so long as the agent does not impair the effects of the present invention. For the non-drying agent, for example, at least one selected from the group consisting of trimethylglycine, carnitines, pentaerythritol, sugar alcohols, dextrin, and reduced starch syrup may be used, or two or more selected from the group may be used in combination. The non-drying agent may be incorporated in a range of 0.1 to 20 mass % and more preferably 0.5 to 15 mass % relative to the amount of the entire aqueous ink composition.

The aqueous ink composition to be loaded into the writing instrument of the present invention preferably has a surface tension at 25° C. of 30 to 60 mN/m and more preferably 28 to 58 mN/m from the viewpoints of ink leakage from a pen tip and ink permeability into a paper surface. The surface tension can be adjusted by controlling the amount of each of the ink components described above or incorporating a thickener.

In the present invention (including Examples described below), the surface tension (25° C.) of the ink refers to a value measured with a surface tensiometer: CBVP-Z available from Kyowa Interface Science Co., Ltd.

In the present invention, the resulting aqueous ink composition for a writing instrument has a viscosity at 191.5 sec$^{-1}$ and 25° C. of preferably 1 to 12 mPa's and more preferably 1.5 to 8 mPa's, from the viewpoints of writing performance, the stability of the ink, bleeding resistance, and ink flow properties.

In the present invention (including Examples described below), the viscosity (25° C.) refers to a value measured with a cone-plate type viscometer (available from Toki Sangyo Co., Ltd.: TV-25 (ELD) type). The above-described surface tension or the range of the viscosity at the above shear rate can be adjusted by suitably combining, for example, the types and amounts of the components to be used and the stirring method.

The aqueous ink composition to be loaded into the writing instrument of the present invention can be prepared by combining at least the dispersion of the colored resin fine particles enclosing a basic dye, an oil-soluble dye or an acid dye composed as described above, a water-soluble solvent, an additional component, and an appropriate component that is further added in accordance with the application of the ink for a writing instrument (such as a marking pen); stirring the combined mixture with a stirrer, such as a homomixer, a homogenizer, or a disperser; and further removing coarse particles in the ink composition as necessary by filtration or centrifugation.

Writing Instrument

The writing instrument of the present invention to be used is equipped with a pen core and loaded with the aqueous ink composition having the above-described formulation. For example, the aqueous ink composition is loaded into a pen, such as a marking pen or a felt-tip pen, equipped with a pen core, such as a fiber core, a porous core (such as a felt core or a sponge core), a plastic core, brush filaments (a brush-tip pen), a brush core, a sintered core, a rubber core, or an elastomer core.

In the writing instrument of the present invention, the material, structure, and production method of the pen core to be used are not particularly limited. Examples of the pen core include a fiber core obtained by processing a parallel fiber bundle composed of one type or a combination of two or more types of fibers, such as natural fibers, animal fur fibers, polyacetal-based resins, acrylic resins, polyester-based resins such as PET, polyamide-based resins such as nylon resins, polyurethane resins, polyolefin-based resins, polyvinyl-based resins, polycarbonate-based resins, polyether-based resins, polyphenylene-based resins, or poly(butylene terephthalate) (PBT)-based resins, or a fiber bundle of felt, or by treating any fiber bundle of these with a resin; a plastic core in which an ink groove is formed in the axial direction of any type of plastic material described above; a porous body or brush form (brush body) obtained by fusing any type of plastic powder described above; and a rubber core or and elastomer core composed of a synthetic rubber such as the above resin, a natural rubber, or a thermoplastic elastomer such as the above resin. The pen core is also in any form, such as a plate-like body, a fiber bundle, a sintered body, or a foam body.

Preferably, the material of the pen core of the writing instrument is at least one selected from Group A below from the viewpoints of writing performance and durability.

Group A: a polyester core, an acrylic core, a nylon core, a poly(butylene terephthalate) (PBT) core, a polyethylene core, a rubber core, a urethane core, a polyacetal (POM) core, a polypropylene (PP) core, a poly(ethylene naphthalate) (PEN) core, and a poly(ethylene terephthalate) (PET) core.

In the present invention, formation of the pen core from a material selected from Group A above enables prevention of dye deposition to the pen core, inhibition of ink discoloration due to the dye deposition, and a further improvement in writing feeling.

More preferably, the pen core is a fiber core, plastic core, or elastomer core composed of a material selected from Group A above and having a pen core structure illustrated in FIG. 1 or 2 below.

Figure 1N:
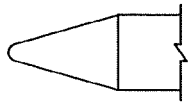
Figure 2A:
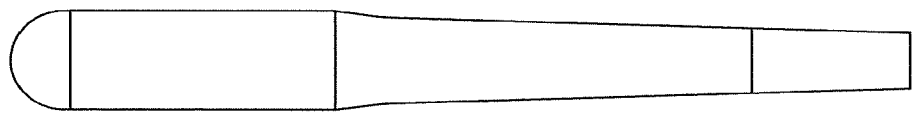
FIG. 2A to 2J are explanatory diagrams illustrating the structure of pen cores composed of plastic cores in the writing instrument of the present invention.
Figure 2B:
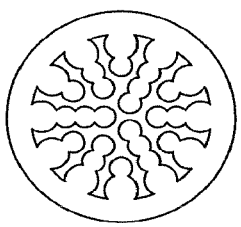
Figure 2C:
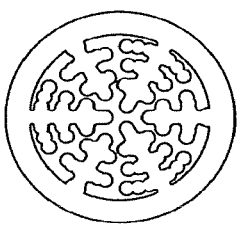
Figure 2D:
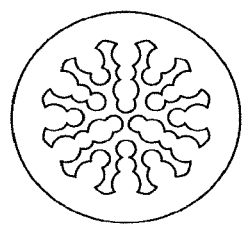
Figure 2E:
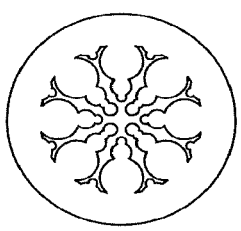
Figure 2F:
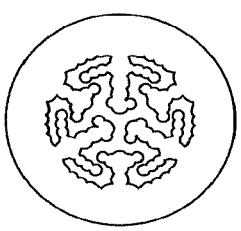
Figure 2G:
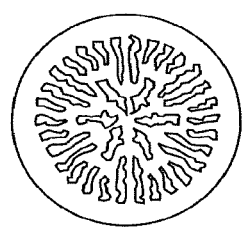
Figure 2H:
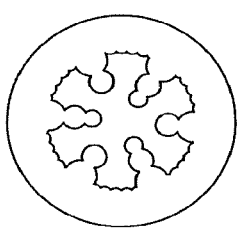
Figure 2I:
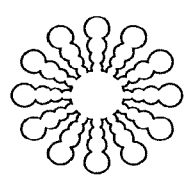
Figure 2J:
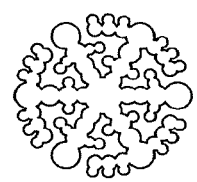

Specific examples of the shape of the pen core composed of a fiber core to be used include those illustrated in FIGS. 1A to 1N. In addition, examples of the aspect of the ink groove of the pen core composed of the plastic core of FIG. 2A in which the ink groove is formed in the axial direction of any type of plastic material include configurations illustrated in FIGS. 2B to 2J.

A fiber core used as the pen core preferably has a porosity of 30 to 75% and a slit diameter of approximately 1 to 20 µm. In addition, a plastic core used as the pen core preferably has an average slit diameter of 20 to 40 µm. However, the porosity and the slit diameter are not limited to the above numerical ranges as long as the effects of the present invention can be achieved. Furthermore, the slit diameter is calculated by the following equation.

$$\text{Slit diameter}=\text{porosity}\times\text{radius of yarn}/(1-\text{porosity})$$

The structure of the writing instrument according to an embodiment of the present invention is not particularly limited as long as the structure has a pen core, such as a fiber core, a plastic core, an elastomer core, a sintered core, or a sponge core used in common pens, such as a marking pen, a felt-tip pen, or a brush-tip pen, and the structure can be applied to a writing instrument having a writing instrument cap or a writing instrument having no writing instrument cap. Examples of the writing instrument according to an embodiment of the present invention include structures of writing instruments illustrated in FIGS. 3 to 7 having a writing instrument cap, structures of a marking pen, a felt-tip pen, or a brush-tip pen including a simple sealing mechanism, and a structure illustrated in FIG. 8 of a knock-type felt-tip pen, marking pen, or brush-tip pen that does not require a writing instrument cap. In addition, examples of the writing instrument include a writing instrument illustrated in FIGS. 9 to 13 that is applicable to a felt-tip pen or marking pen that freely changes the width of a drawn line by writing pressure.

Figure 3:
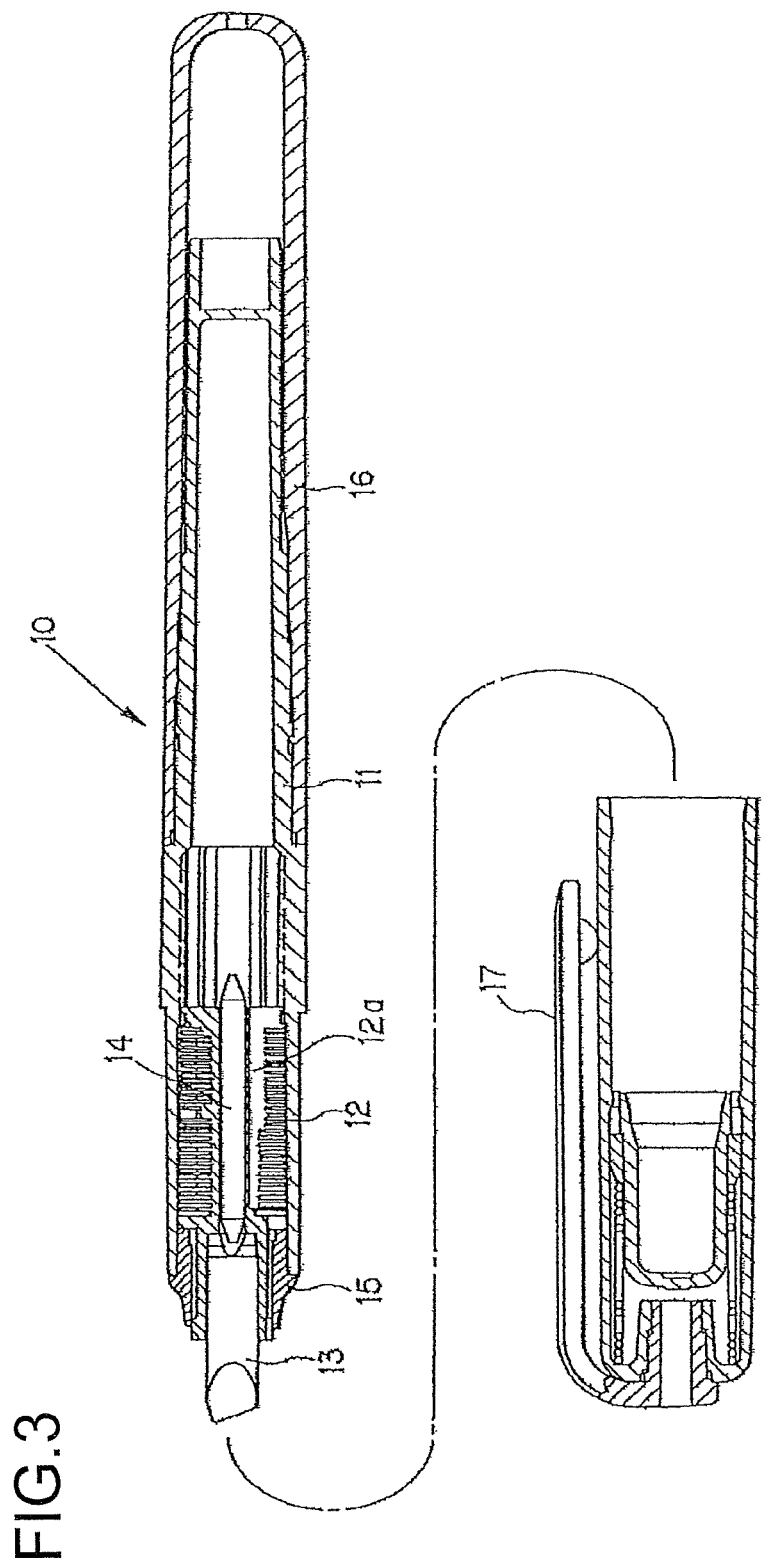
FIG. 3 is a vertical cross-sectional view illustrating a direct liquid-type writing instrument, the writing instrument being an embodiment of the writing instrument of the present invention.

FIG. 3 illustrates a direct liquid-type writing instrument. The direct liquid-type writing instrument 10 has an ink tank portion 11 serving as a barrel for directly storing an ink without absorption of the ink in wadding or a like material. An ink reservoir (collector member) 12 is incorporated in the front portion of the ink tank portion 11, and the ink reservoir 12 temporarily stores the ink to be pushed out from the ink tank when the air in the ink tank portion 11 expands due to a temperature rise, to prevent the ink from dripping from the pen tip or an air hole. A tip portion of the collector member 12 is provided with a pen tip 13 composed of a fiber core. The ink is led out from the ink tank portion 11 to the pen tip 13 through a relay core 14 having an ink flow path provided in a central hole 12a of the collector member 12. In FIG. 3, reference numeral 15 indicates a holder member, 16 indicates a rear barrel fixed to the rear portion of the ink tank portion 11, and 17 indicates a cap. The ink may be led out by directly disposing the rear portion of the pen tip 13 inside the ink tank portion 11 without interposing the relay core 14.

Figure 4:
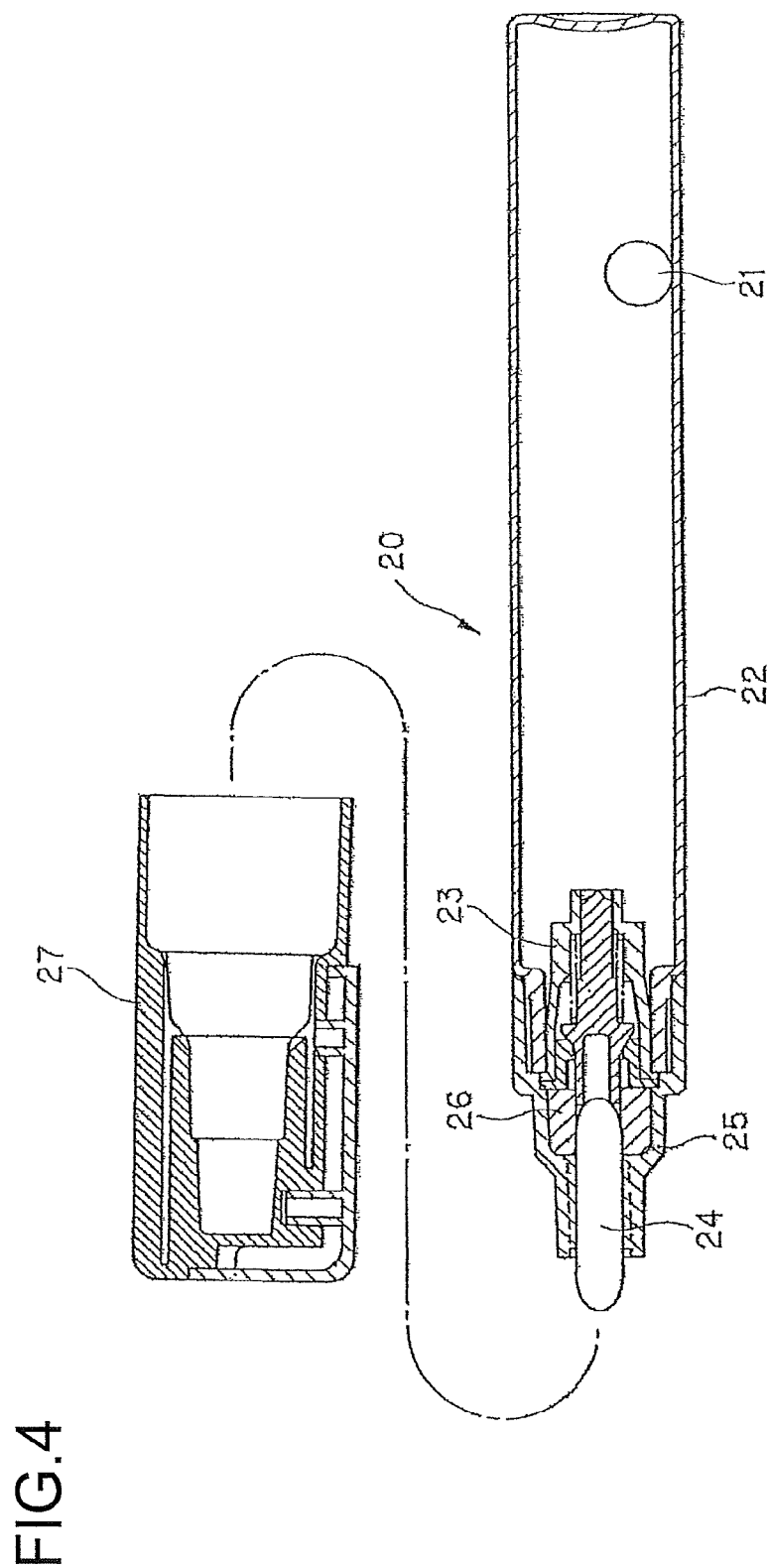
FIG. 4 is a vertical cross-sectional view illustrating a writing instrument including a valve mechanism, the writing instrument being another embodiment of the writing instrument of the present invention.

A writing instrument 20 in FIG. 4 is a valve-type writing instrument incorporating a hard ball 21 serving as a stirring ball. The writing instrument 20 has an ink tank portion 22 serving as a barrel for directly storing ink without absorption of the ink in wadding or a like material, and is configured to supply the ink to a pen tip 24 composed of a fiber core through a valve mechanism 23. In FIG. 4, reference numeral 25 indicates a holder member, 26 indicates a holding member interposed between the valve mechanism 23 and the holder member 25 and holding the rear portion of a pen tip 24, and 27 indicates a cap.

Figure 5:
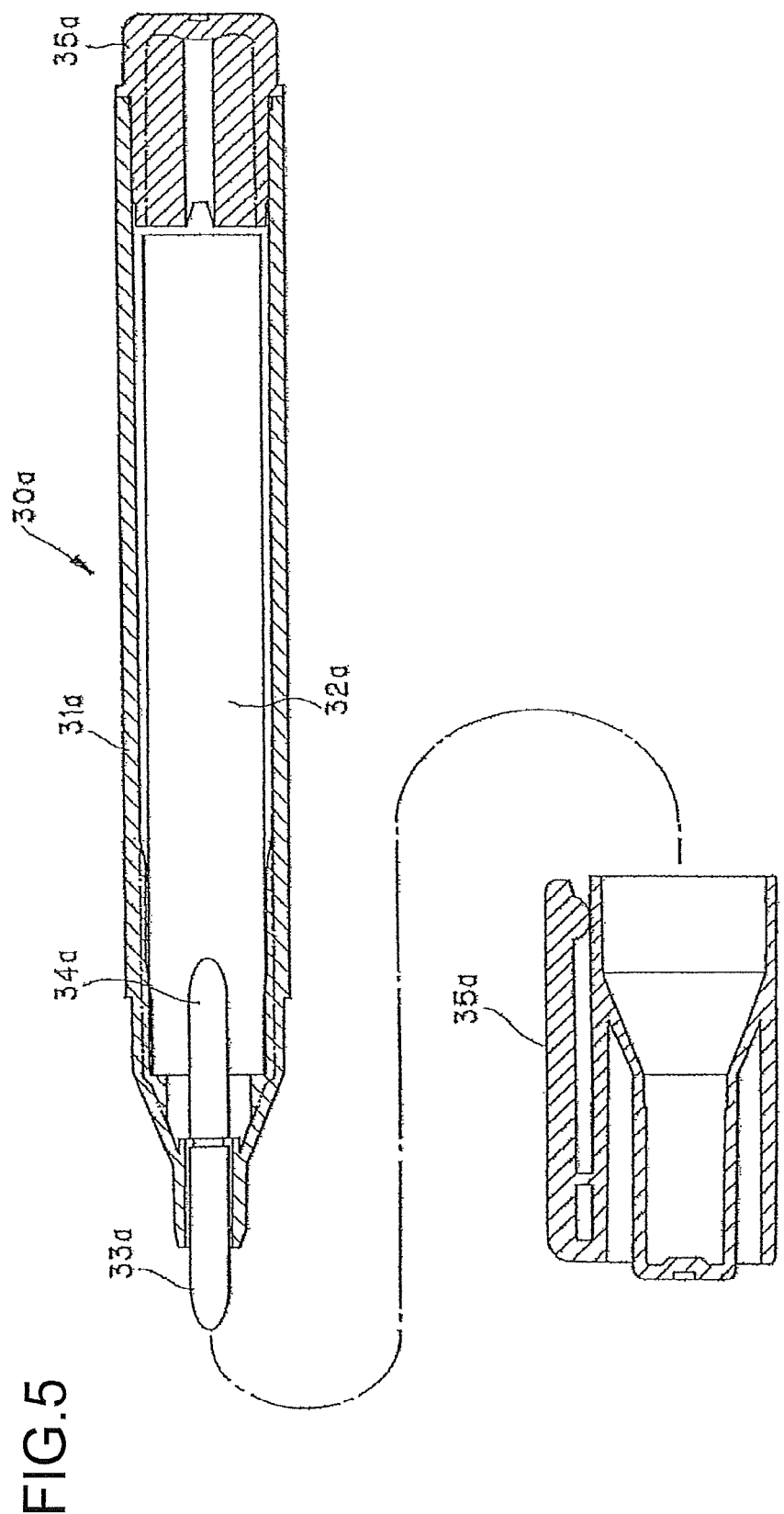
FIG. 5 is a vertical cross-sectional view illustrating a type of writing instrument in which an ink is absorbed in an ink absorber such as wadding, the writing instrument being another embodiment of the writing instrument of the present invention.
Figure 6:
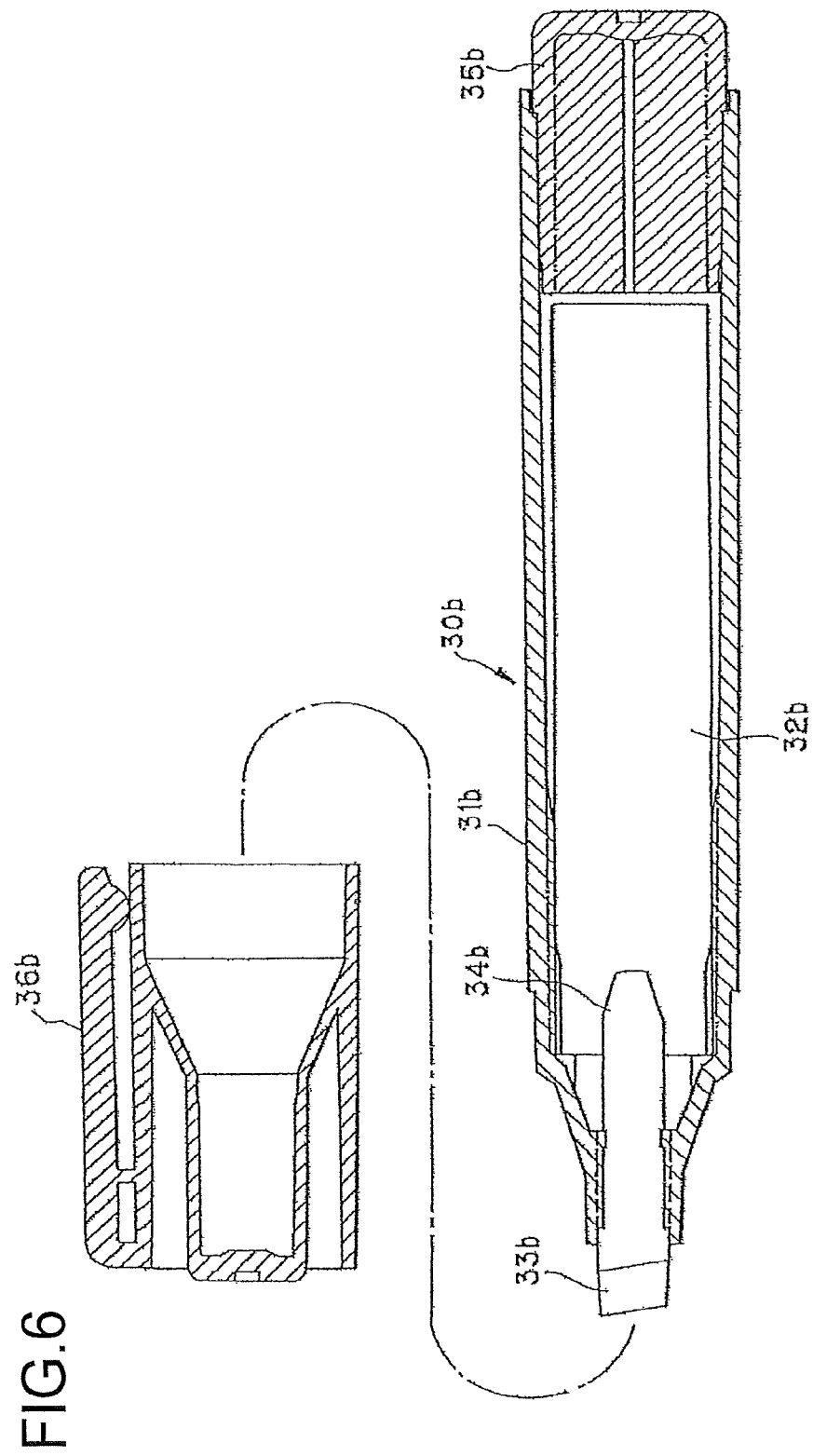
FIG. 6 is a vertical cross-sectional view illustrating a type of writing instrument in which an ink is absorbed in an ink absorber such as wadding, and a pen core has a shape different from that in FIG. 5, the writing instrument being another embodiment of the writing instrument of the present invention.

FIGS. 5 and 6 both illustrate a type of writing instrument in which an ink is absorbed in an ink absorber, such as wadding. Each of the writing instruments 30a and 30b has an ink absorber 32a or 32b inside a barrel body 31a or 31b serving as a barrel, the absorber 32a or 32b absorbing ink in a fiber body, such as wadding, and a rear-end portion 34a or 34b of a pen tip 33a or 33b composed of a fiber core is configured to be in contact with the front portion of the ink absorber 32a or 32b to supply the ink in the ink absorber 32a or 32b to the pen tip 33a or 33b. Reference numeral 35a or 35b indicates a tail plug fixed to the rear-end portion of the barrel body 31a or 31b, and 36a or 36b indicates a cap. The writing instruments of FIGS. 5 and 6 slightly differ from each other in the shape of the barrel bodies 31*a* and 31*b* and the pen tips 33*a* and 33*b* and the structure of the tail plugs 35*a* and 35*b*.

Figure 7:
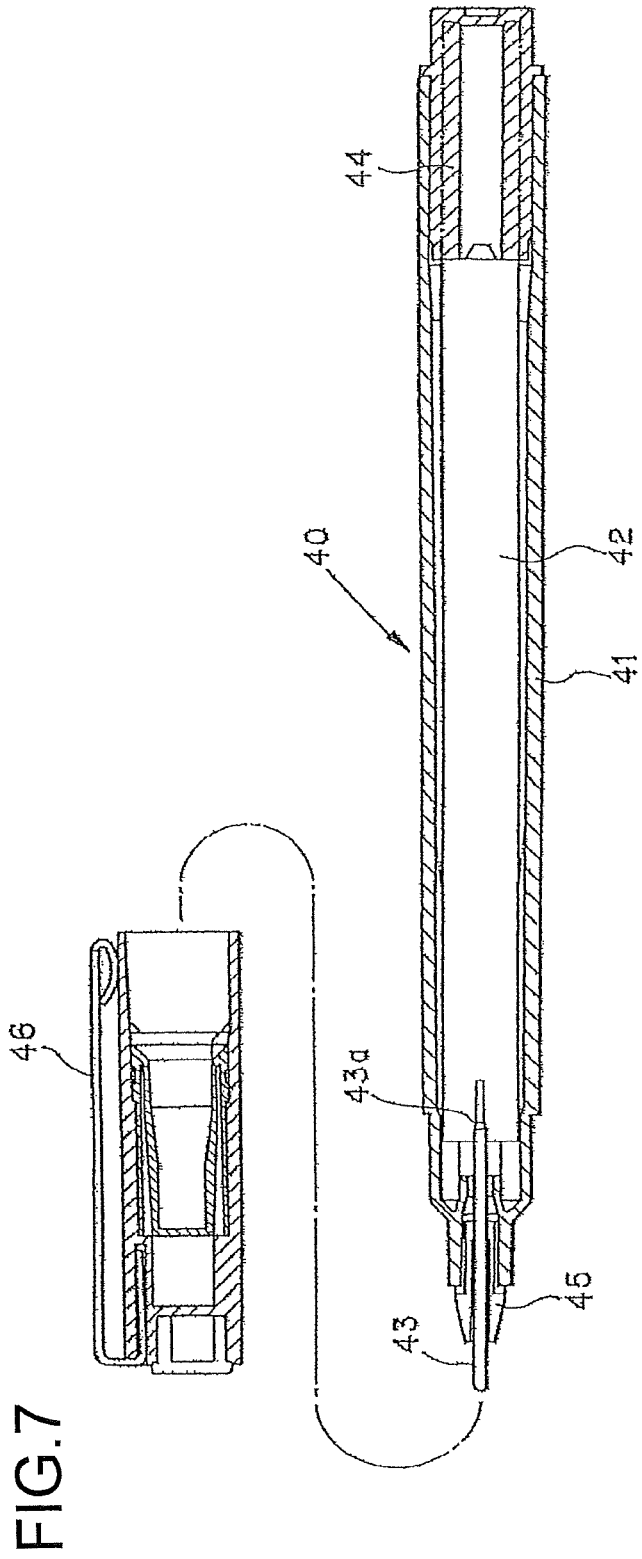
FIG. 7 is a vertical cross-sectional view illustrating a type of writing instrument in which an ink is absorbed in an ink absorber such as wadding, and a pen core has a shape different from that in FIG. 5 or 6, the writing instrument being another embodiment of the writing instrument of the present invention.

FIG. 7 illustrates a felt-tip pen-type writing instrument in which an ink is absorbed in an ink absorber, such as wadding, as in FIG. 5. The writing instrument 40 has an ink absorber 42 inside a barrel body 41 serving as a barrel, the ink absorber 42 absorbing ink in a fiber body, such as wadding, and a rear-end portion 43*a* of a pen tip 43 composed of a plastic core is configured to be in contact with the front portion of the ink absorber 42 to supply the ink in the ink absorber 42 to the pen tip 43. Reference numeral 44 indicates a tail plug fixed to the rear-end portion of the barrel body 41, 45 indicates a holder member, and 46 indicates a cap.

Figure 8:
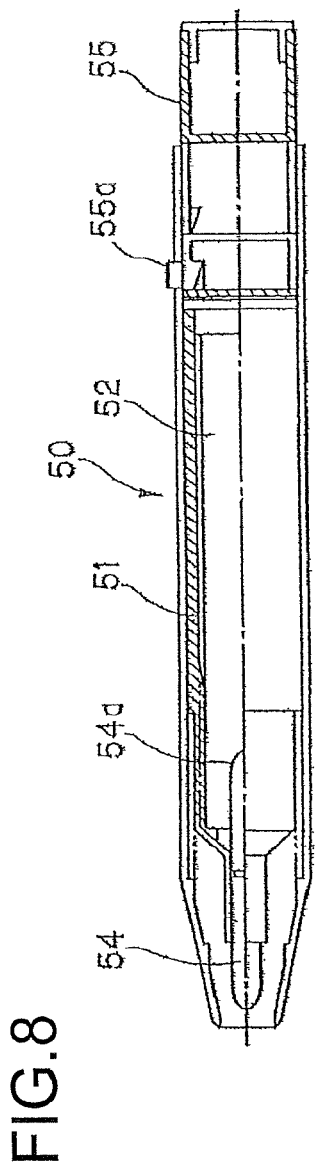
FIG. 8 is a vertical cross-sectional view illustrating a knock-type writing instrument, the writing instrument being another embodiment of the writing instrument of the present invention.

FIG. 8 illustrates a knock-type writing instrument in which an ink is absorbed in an ink absorber, such as wadding, and the writing instrument does not require a cap of a felt-tip pen type. The writing instrument 50 includes an inner barrel 53 having an ink absorber 52 inside a barrel 51, the absorber 52 absorbing an ink in a fiber body, such as wadding, and a rear-end portion 54*a* of a pen tip 54 composed of a fiber core is configured to be in contact with the front portion of the ink absorber 52 to supply the ink in the ink absorber 52 to the pen tip 54. Reference numeral 55 indicates a knock portion attached to the rear-end portion of the barrel 51. The writing instrument 50 is configured to allow the pen tip 54 to come out of the barrel 51 and to be in a writing state by pushing the knock portion 55 forward and to house the pen tip 54 in the barrel 51 by operating a release button 55*a*.

FIGS. 9 to 13 illustrate another embodiment of the writing instrument of the present invention, and are a perspective view, a front view, and a vertical cross-sectional view of a writing instrument applicable to a felt-tip pen or a marking pen that freely changes the width of a drawn line by writing pressure, an enlarged vertical cross-sectional view illustrating a plastic pen core portion, and a transverse cross-sectional view of the plastic pen core.

Figure 9:
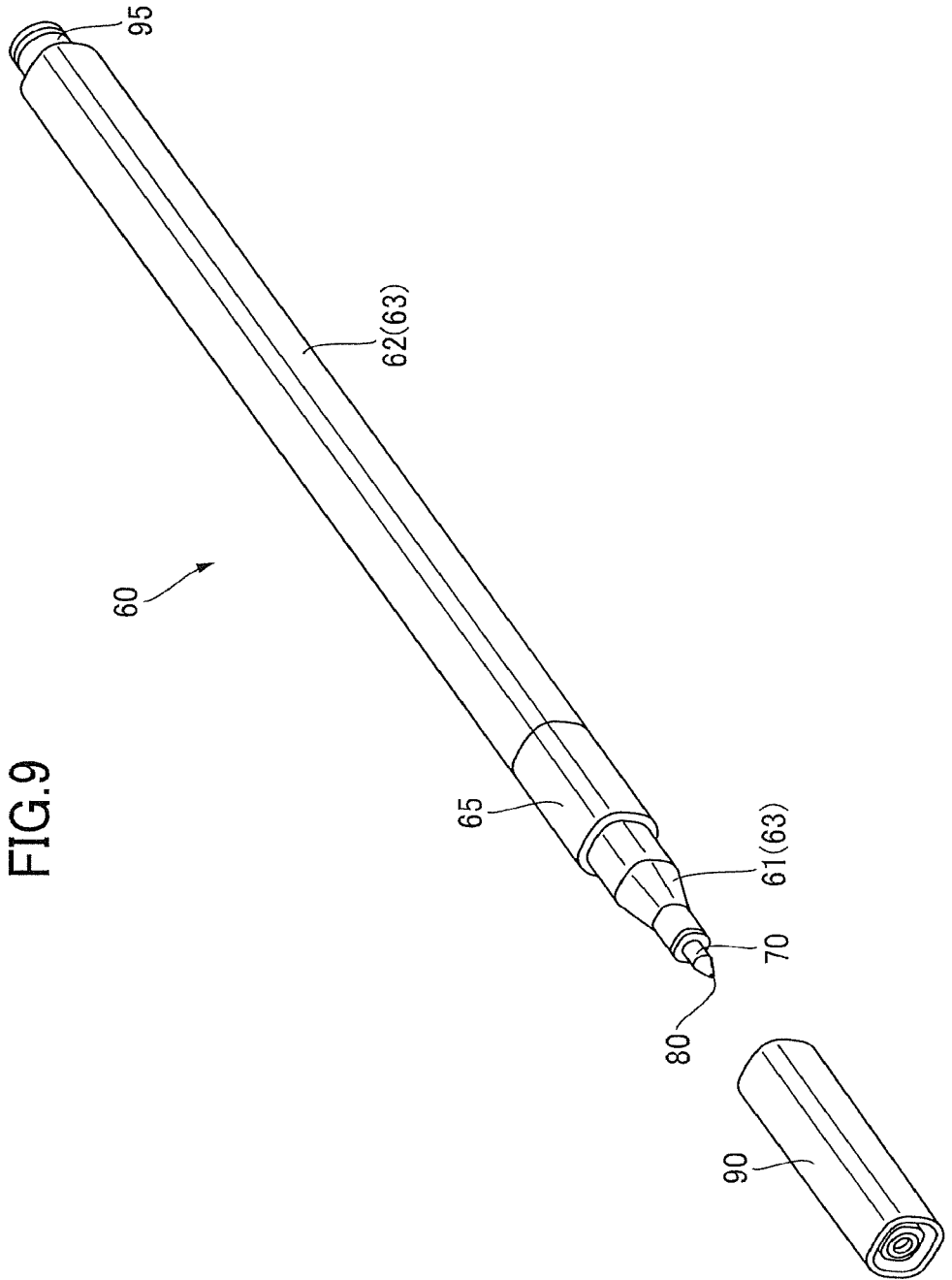
FIG. 9 is a perspective view illustrating another embodiment of the writing instrument of the present invention; i.e., a writing instrument applicable to a felt-tip pen or a marking pen that freely changes the width of a drawn line by writing pressure.
Figure 10:
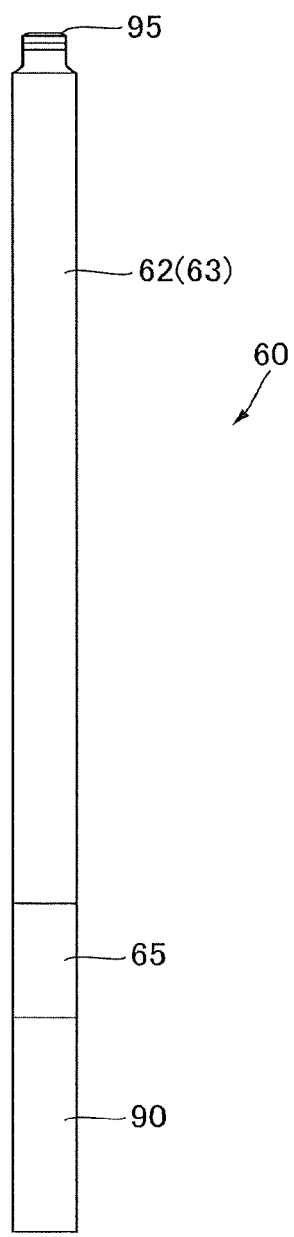
FIG. 10 is a front view of the writing instrument of FIG. 9.
Figure 11:
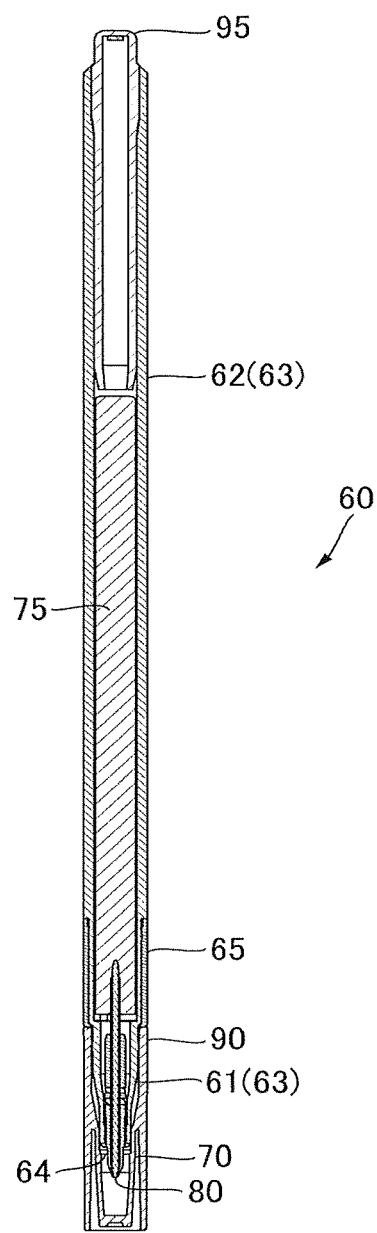
FIG. 11 is a vertical cross-sectional view of the writing instrument of FIG. 9.

As illustrated in FIGS. 9 to 11, this writing instrument 60 includes a barrel 63 in which a front barrel 61 having a smaller diameter and a rear barrel 62 having a larger diameter are integrally formed, and a core surrounding member 70 mounted on the front side of the front barrel 61. Wadding 75 storing the aqueous ink composition having the above-described formulation is housed inside the rear barrel 62. In the vicinity of the tip of the front barrel 61, there is provided an air replacement port (not illustrated) allowing air to flow between the inside and the outside of the barrel 63. In addition, an ink supply core 80 passes through the core surrounding member 70. The tip of the ink supply core 80 protrudes from the tip of the core surrounding member 70. The rear end of the ink supply core 80 extends to pierce the front end of the wadding 75. In addition, a cap 90 is attached to the front barrel 61 illustrated in FIG. 9, and the writing instrument 60 exhibits an appearance as illustrated in FIGS. 9 and 10 when not in use.

As described above, the barrel 63 has the front barrel 61 and the rear barrel 62. A front opening 64 opens at a front-end portion of the front barrel 61, and a rear opening 65 opens at a rear-end portion of the rear barrel 62. A tail plug 95 is press-fitted into the rear opening 65.

As illustrated in FIG. 9, the outer shape of the barrel 63 is formed to have an entirely rounded quadrangular cross section in the transverse direction. Furthermore, a flange portion 96 of the tail plug 95 is in contact with the rear-end edge of the rear barrel 62.

In addition, a gripping member 65 is formed on the outer peripheral surface on the front side of the rear barrel 62. A color different from that of the barrel 63 may be imparted to the gripping member 65, and the color may be, for example, a color similar to that of the ink stored in the wadding 75. The barrel 63 and the gripping member 65 can be formed, for example, by two-color molding.

The tail plug 95 is formed into a cylindrical shape as a whole, seals the inside of the rear barrel 63, and blocks the inside of the rear barrel 63 from the outside air.

The wadding 75 is composed of a cylindrical polyester fiber material for storing the ink and is housed inside the rear barrel 62 of the barrel 63. As illustrated in FIG. 11, the wadding 75 is fixed inside the rear barrel 62.

Figure 12:
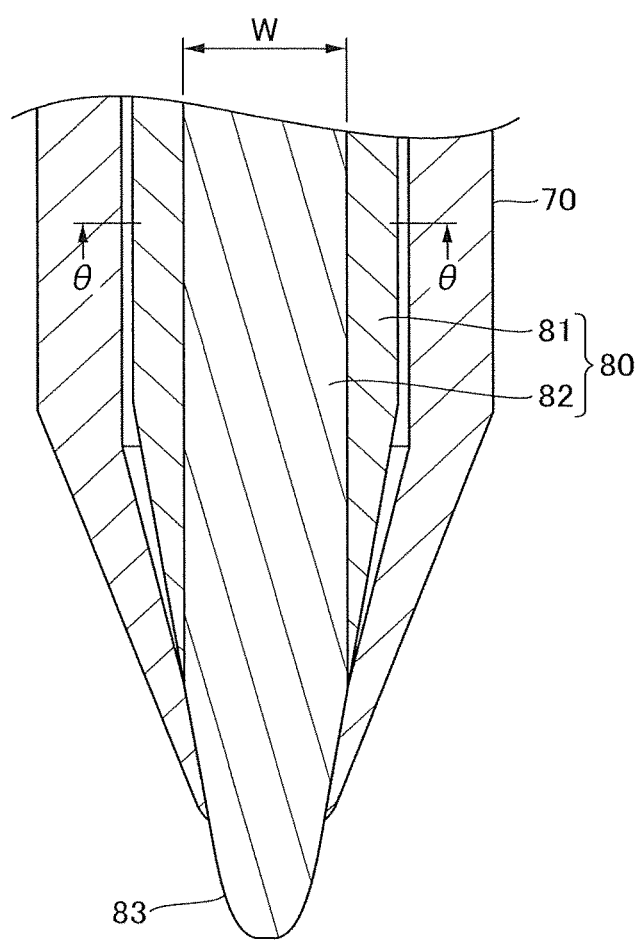
FIG. 12 is an enlarged vertical cross-sectional view illustrating a plastic pen core portion of the writing instrument of FIG. 9.

As illustrated in FIG. 12, the ink supply core 80 has an outer peripheral portion 81, a flow path 82, and a tip portion 83. The ink supply core 80 is formed by extrusion molding of a polyacetal resin and has a substantially cylindrical shape as a whole from the front side to the rear side. The tip portion 83 is formed into a conical shape with a diameter decreasing toward the front side as illustrated in FIG. 12, and a rear-end portion side is formed into a conical shape with a diameter decreasing toward the rear side. The ink supply core 80 has a barrel portion sandwiched between the tip portion 83 and the rear-end portion side. The ink supply core 80 may be composed of a fiber bundle core or a sintered core.

Figure 13:
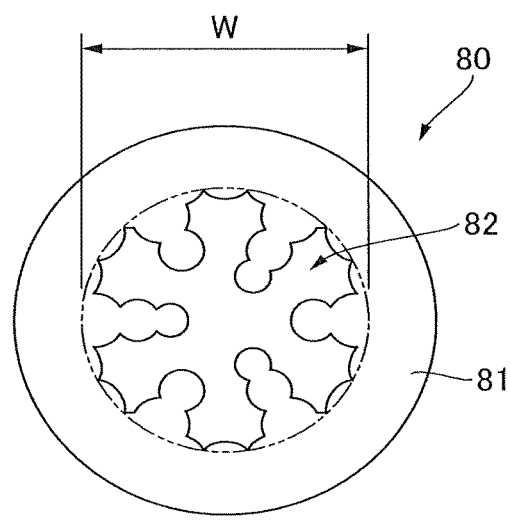
FIG. 13 is a cross-sectional view taken along line θ-θ in FIG. 12 (transverse cross-sectional view of a pen core composed of a plastic core).

The outer peripheral portion 81 forms an outer surface of the ink supply core 80. The tip of the tip portion 83 and the tip on the rear-end portion side of the outer peripheral portion 81 are formed such that the flow path 82 is exposed. The flow path 82 is formed along the axial center inside the outer peripheral portion 81 and is exposed at the tip portion 83 and on the rear-end portion side of the outer peripheral portion 81 as described above. When a die having a fine gap at the central portion is used in the extrusion molding of the ink supply core 80, the flow path 82 is formed as a fine gap at the central portion of the cross section. The flow path 82 as a gap exerts a capillary force and holds the ink. In this case, in the ink supply core 80, the outer peripheral portion 81 and the flow path 82 are integrally formed. As illustrated in FIGS. 12 and 13, the flow path 82 is formed as a portion along the axial center, that is, a portion occupying the diameter W, and a portion occupying its periphery is the outer peripheral portion 81.

The flow path 82 is formed as a region having a cavity whose inner peripheral edge at the axial center portion is irregular, for example, as in the cross-sectional view of the ink supply core 80 illustrated in FIG. 12, and the outer diameter W of the flow path is defined as the diameter of a circle virtually circumscribing the cavity. In the case of forming the flow path 82 with a fiber bundle core or a sintered core having a capillary structure, the outer peripheral portion 81 can be formed as a thick portion outside the flow path 82 in the ink supply core 80 by forming the outer peripheral portion 81 as a structure for coating the outer surface of the flow path 82, and the outer peripheral portion 81 can be fixed to the core surrounding member 70 without exposing the outer surface of the flow path 82. In the ink supply core 80, the ink stored in the wadding 75 is guided from the rear-end portion side inserted into the wadding 75 to the tip portion 83 by the capillary force.

The writing instrument 60 of this embodiment has the barrel 63; the ink supply core 80 that is housed inside the barrel 63 and guides the ink by the capillary force; and the core surrounding member 70 attached to the tip of the barrel 63, in which the ink supply core 80 passes through the core surrounding member 70 and the tip of the ink supply core 80 protrudes from the core surrounding member 70. In addition, the ink supply core 80 is configured to be moved backward at the tip of the core surrounding member 70 by writing pressure, and an expanded portion (not illustrated) in which the gap between the ink supply core 80 and the core surrounding member 70 is expanded over the entire circumference is provided at the tip portion of the ink supply core 80, and an annular groove (not illustrated) over the entire circumference is provided at the tip portion of the ink supply core 80. Such a configuration enables the width of a drawn line to be freely changed by writing pressure.

It goes without saying that the writing instrument of the present invention is not limited to the writing instrument and the pen core of each of the embodiments of FIGS. 1 to 13 and can be modified into various forms without changing the scope of the present invention. For example, the writing instrument of the present invention is not limited to a direct liquid-type writing instrument in which the aqueous ink composition having the above-described formulation is directly stored without being absorbed in wadding or a like material, a writing instrument including a valve mechanism, or a type of writing instrument in which the ink composition is absorbed in an ink absorber, such as wadding. The writing instrument of the present invention is not particularly limited as long as a pen core composed of a fiber bundle core or a plastic core has the above properties, and can be applied to, for example, writing instruments, such as brush-tip pens and cartridge type pens. In addition, the writing instrument of the present invention can be suitably used for writing instruments having a structure of a knock-type marking pen, felt-tip pen, or brush-tip pen that does not require a writing instrument cap.

The thus-configured writing instrument of the present invention is loaded with a water-based ink composition containing colored resin particles being formed by polymerization of a monomer comprising at least cyclohexyl (meth)acrylate and enclosing a basic dye, an oil-soluble dye or an acid dye; and an anionic surfactant.

The resultant writing instrument prevents dye deposition to a pen core, and highly achieves both inhibition of ink discoloration due to the dye deposition and improvement of writing feeling without impairing writing performance, and the writing instrument is suitably a felt-tip pen or a marking pen.

In particular, the writing instrument having a pen core composed of a material selected from Group A, that is, a polyester core, an acrylic core, a nylon core, a poly(butylene terephthalate) (PBT) core, a polyethylene core, a rubber core, a urethane core, a polyacetal (POM) core, a polypropylene (PP) core, a poly(ethylene naphthalate) (PEN) core, and a poly(ethylene terephthalate) (PET) core, can further improve the effects of the present invention based on the difference in polarity of the material.

EXAMPLES

The present invention will next be described in more detail with reference to Production Examples, Examples, and Comparative Examples, but the present invention is not limited to the following Examples.

Production Examples 1 to 3: Production of Dispersions of Colored Resin Fine Particles (Particles 1 to 3)

Dispersions of colored resin fine particles were produced according to Production Examples 1 to 3 below. The "parts" described below refer to parts by mass.

Production Example 1

A 2-liter flask was equipped with a stirrer, a reflux condenser, a thermometer, a nitrogen gas inlet tube, and a 1000-mL separatory funnel for addition of a monomer and set in a hot water bath, and 324.5 parts of distilled water, 5 parts of glycerol monomethacrylate [BLEMMER GIM, available from NOF Corporation], 5 parts of sodium 2-sulfoethyl methacrylate [acrylic ester SEM-Na, available from Mitsubishi Chemical Corporation], 40 parts of a polymerizable surfactant [ADEKA REASOAP SE-10N, available from ADEKA Corporation, ether sulfate], and 0.5 parts of ammonium persulfate were placed in the flask, and the internal temperature was raised to 50° C. while nitrogen gas was introduced. Separately, 40 parts of an oil-soluble dye [OIL PINK 314 available from Orient Chemical Industries Co., Ltd.] and 10 parts of a cross-linker [triallyl isocyanurate, "TAIC" available from Nihon Kasei Co., Ltd.] were mixed with a mixed monomer containing 40 parts of a cyclohexyl methacrylate monomer and 35 parts of n-butyl methacrylate as an additional monomer, to prepare a solution.

This prepared solution was added from the separatory funnel to the flask maintained at a temperature of about 50° C. for 3 hours under stirring to carry out emulsion polymerization. The resultant product was further aged for 5 hours to terminate the polymerization, to produce a dispersion of colored resin fine particles (particles 1) for a writing instrument.

The content of the cyclohexyl methacrylate monomer was 22.9 mass % relative to the amount of the polymerizable polymer component forming the colored resin fine particles, the content of the dye was 22.9 mass % relative to the amount of the polymerizable polymer component, and the average particle size of the colored resin fine particles was 108 nm.

Production Example 2

An aqueous dispersion of colored resin fine particles (particles 2) for a writing instrument was produced in the same manner as in Production Example 1 above except for changing the amount of distilled water to 319.5 parts, the amount of the cyclohexyl methacrylate monomer to 35 parts, the amount of n-butyl methacrylate to 45 parts, and using 40 parts of an oil-soluble dye [OIL YELLOW 129 available from Orient Chemical Industries Co., Ltd.] as the dye in Production Example 1 above. The content of the cyclohexyl methacrylate monomer was 19.4 mass % relative to the amount of the polymerizable polymer component forming the colored resin fine particles, and the content of the dye was 22.2 mass % relative to the amount of the polymerizable polymer component. The average particle size of the colored resin fine particles was 68 nm.

Production Example 3

An aqueous dispersion of colored resin fine particles (particles 3) for a writing instrument was produced in the same manner as in Production Example 1 above except for changing the amount of distilled water to 313.5 parts, the amount of the cyclohexyl methacrylate monomer to 60 parts, the amount of n-butyl methacrylate to 30 parts, and using 20 parts of a basic dye [SWT YELLOW-2 available from Hodogaya Chemical Co., Ltd.] as the dye in Production Example 1 above.

The content of the cyclohexyl methacrylate monomer was 35.3 mass % relative to the amount of the polymerizable polymer component forming the colored resin fine particles, the content of the dye was 11.8 mass % relative to the amount of the polymerizable polymer component, and the average particle size of the colored resin fine particles was 97 nm. The dispersions of colored resin fine particles for a writing instrument produced in Production Examples 1 to 3 above had a resin solid content of 20 to 40 mass %.

Examples 1 to 9 and Comparative Examples 1 to 3: Preparation of Aqueous Ink Compositions for Writing Instrument An aqueous ink composition for a writing instrument was prepared by an ordinary method using each of the dispersions of colored resin fine particles (particles 1 to 3) produced in Production Examples 1 to 3 and other components according to the formulation (total amount of 100 mass %) shown in Table 1 below. The viscosity at 191.5 sec$^{-1}$ and 25° C. and the surface tension at 25° C. of each of the resulting aqueous ink compositions for a writing instrument (total amount of 100 mass %) were measured with the measuring apparatuses described above.

In addition, each of the resulting aqueous ink compositions for a writing instrument (total amount of 100 mass %) was loaded into a writing instrument having a configuration below and evaluated for discoloration of a pen core, change in hue of a drawn line, and writing feeling by the evaluation methods described below.

The evaluation results of Examples 1 to 9 and Comparative Examples 1 to 3 are shown in Table 1 below.

Configuration of Writing Instrument

Writing instruments (marking pens: in accordance with FIGS. 1 and 2) having the configurations below were prepared using the ink compositions for a writing instrument produced in Examples 1 to 9 and Comparative Examples 1 to 3 above and pen tips A to E below, and the writing instruments were subjected to the evaluations below.

A marking pen [available from Mitsubishi Pencil Co., Ltd., trade name: PEM-SY, pen tip: each of the pen tips having the configurations below] was loaded with each of the ink compositions for a writing instrument above, to prepare a marking pen.

Pen tip A: material: poly(ethylene terephthalate) elastomer, shape: inclined shape (knife-cut shape): φ3.2×32 mm Pen tip B: material: poly(butylene terephthalate) elastomer, shape: bullet shape: φ2.0×30 mm Pen tip C: material: poly(ethylene terephthalate) elastomer, shape: brush shape (brush body)

Pen tip D: material: sintered core (porous body of polyethylene powder, porosity: 60%), shape: inclined shape (knife-cut shape): φ3.2×32 mm Pen tip E: material: polyacetal (POM) resin, shape: bullet shape: φ2.0×30 mm Barrel 10, tail plug 15, mounting member 16, and cap 40: all made of a polypropylene (PP) resin Ink absorber 20: poly(ethylene terephthalate) resin, porosity: 80%

Discoloration of the pen core, change in hue of a drawn line, and writing feeling were evaluated using each of the resulting marking pens by the following evaluation methods.

Method for Evaluating Discoloration of Pen Core

Discoloration of the pen core was sensorily evaluated by visual observation according to the following evaluation criteria for the pen core after the marking pens were stored in a horizontal position in an environment of 25° C. and a humidity of 65% for one month.

Evaluation Criteria:
A: No change is observed from the initial state.
B: A slight discoloration is observed.
C: A significant discoloration is observed.

Method for Evaluating Change in Hue of Drawn Line

A spiral line was drawn on a PPC paper sheet using each of the above writing instruments after the marking pens were stored above and the hue of the drawn line was sensorily evaluated by visual observation according to the following evaluation criteria.

Evaluation Criteria:
A: No change is observed from the initial state.
B: A slight change in hue is observed.
C: A significant change in hue is observed.

Method for Evaluating Writing Feeling

A spiral line was drawn on a PPC paper sheet using each of the above writing instruments after the marking pens were stored in a horizontal position in an environment of 25° C. and a humidity of 65% for three months. The writing feeling was sensorily evaluated according to the following evaluation criteria.

Evaluation Criteria:
A: Smoothly drawn without feeling of being caught.
B: A slight feeling of being caught.
C: A significant feeling of being caught.

TABLE 1

(Total amount of 100 mass %)

| | | Examples | | | | | | |
|---|---|---|---|---|---|---|---|---|
| | | 1 | 2 | 3 | 4 | 5 | 6 | 7 |
| Colored resin particles and other components (colorant) | Colored resin particles 1 (Production Example Average particle size: 108 nm) | 20 | 20 | 20 | | | | |
| | Colored resin particles 2 (Production Example Average particle size: 68 nm) | | | | 20 | 20 | 20 | |
| | Colored resin particles 3 (Production Example Average particle size: 97 nm) | | | | | | | 20 |
| | Oil-soluble dye (OIL PINK 314 available from Orient Chem. Ind. Co., Ltd.) | | | | | | | |
| | Thermochromic particles Average particle size: 2 μm | | | | | | | |

TABLE 1-continued

| | | | | | | | | | |
|---|---|---|---|---|---|---|---|---|---|
| Anionic surfactants and other surfactants | Phosphate ester-based surfactant 1 Phosphanol RD-720N (HLB: 14.4) | *1 | 2 | | | | | | |
| | Phosphate ester-based surfactant 2 Phosphanol RB-410 (HLB: 8.6) | *2 | | 2 | | | | | |
| | Phosphate ester-based surfactant 3 Phosphanol RD-510Y (HLB: 9.9) | *3 | | | 2 | | | | |
| | Phosphate ester-based surfactant 4 Phosphanol RD-510Y (HLB: 13.3) | *4 | | | | 2 | | | |
| | Phosphate ester-based surfactant 5 Plysurf A219B (HLB: 16.2) | *5 | | | | | 2 | | |
| | Phosphate ester-based surfactant 6 NIKKO LDLP-10 (HLB: 8.6) | *6 | | | | | | 2 | |
| | Sulfate ester-based surfactant EMAL 2FG | *7 | | | | | | | 2 |
| | Sulfonic acid-based surfactant Neopelex G-25 | *8 | | | | | | | |
| | Nonionic surfactant Rheodol SP-L10 | *9 | | | | | | | |
| | Nonionic surfactant EMULGEN 108 | *10 | | | | | | | |
| Water-soluble organic solvent: propylene glycol | | | 5 | 5 | 5 | 5 | 5 | 5 | 5 |
| pH adjuster: triethanolamine | | | 0.3 | 0.3 | 0.3 | 0.3 | 0.3 | 0.3 | 0.3 |
| Water | Purified water | | Balance | Balance | Balance | Balance | Balance | Balance | Balance |
| Viscosity (25° C.: mPa·s) | | | 2.8 | 3.2 | 4.1 | 3.9 | 6.2 | 5.2 | 3.7 |
| Surface tension (25° C.: m/N) | | | 38 | 30 | 44 | 28 | 41 | 53 | 48 |
| Pen tip type | | | Pen tip A | Pen tip B | Pen tip C | Pen tip A | Pen tip B | Pen tip C | Pen tip A |
| Discoloration of pen core | | | A | A | A | A | A | A | A |
| Change in hue of drawn line | | | A | A | A | A | A | A | A |
| Writing feeling | | | A | A | A | A | A | A | A |

(Total amount of 100 mass %)

| | | | Examples | | Comparative Examples | | |
|---|---|---|---|---|---|---|---|
| | | | 8 | 9 | 1 | 2 | 3 |
| Colored resin particles and other components (colorant) | Colored resin particles 1 (Production Example Average particle size: 108 nm | | | | 20 | | |
| | Colored resin particles 2 (Production Example Average particle size: 68 nm | | | | | | |
| | Colored resin particles 3 (Production Example Average particle size: 97 nm | | 20 | 20 | | | |
| | Oil-soluble dye (OIL PINK 314 available from Orient Chem. Ind. Co., Ltd.) | | | | | 20 | |
| | Thermochromic particles Average particle size: 2 μm | | | | | | 20 |
| Anionic surfactants and other surfactants | Phosphate ester-based surfactant 1 Phosphanol RD-720N (HLB: 14.4) | *1 | | 1 | | 2 | 2 |
| | Phosphate ester-based surfactant 2 Phosphanol RB-410 (HLB: 8.6) | *2 | | | | | |
| | Phosphate ester-based surfactant 3 Phosphanol RD-510Y (HLB: 9.9) | *3 | | | | | |
| | Phosphate ester-based surfactant 4 Phosphanol RD-510Y (HLB: 13.3) | *4 | | | | | |
| | Phosphate ester-based surfactant 5 Plysurf A219B (HLB: 16.2) | *5 | | | | | |
| | Phosphate ester-based surfactant 6 NIKKO LDLP-10 (HLB: 8.6) | *6 | | | | | |
| | Sulfate ester-based surfactant EMAL 2FG | *7 | | 1 | | | |
| | Sulfonic acid-based surfactant Neopelex G-25 | *8 | 2 | | | | |
| | Nonionic surfactant Rheodol SP-L10 | *9 | | | 2 | | |
| | Nonionic surfactant EMULGEN 108 | *10 | | | | | |
| Water-soluble organic solvent: propylene glycol | | | 5 | 5 | 5 | 5 | 5 |
| pH adjuster: triethanolamine | | | 0.3 | 0.3 | 0.3 | 0.3 | 0.3 |
| Water | Purified water | | Balance | Balance | Balance | Balance | Balance |
| Viscosity (25° C.: mPa·s) | | | 1.5 | 7.7 | 4.9 | 7 | 6.3 |
| Surface tension (25° C.: m/N) | | | 58 | 60 | 38 | 45 | 65 |
| Pen tip type | | | Pen tip D | Pen tip E | Pen tip A | Pen tip A | Pen tip A |

TABLE 1-continued

| | | | | | |
|---|---|---|---|---|---|
| Discoloration of pen core | A | A | C | D | D |
| Change in hue of drawn line | A | A | C | D | C |
| Writing feeling | A | A | D | B | C |

*1 to *10 in Table 1 are as follows.
*1: Sodium polyoxyethylene oleyl ether phosphate, available from Toho Chemical Industry Co., Ltd.
*2: Polyoxyethylene oleyl ether phosphate, available from Toho Chemical Industry Co., Ltd.
*3: Polyoxyethylene lauryl ether phosphate, available from Toho Chemical Industry Co., Ltd.
*4: Polyoxyethylene lauryl ether phosphate, available from Toho Chemical Industry Co., Ltd.
*5: Polyoxyethylene lauryl ether phosphate ester, available from DKS Co. Ltd.
*6: Sodium dipolyoxyethylene <POE (10) > lauryl ether phosphate, available from Nikko Chemicals Co., Ltd.
*7: Sodium lauryl sulfate, available from Kao Corporation
*8: Sodium dodecylbenzenesulfonate, available from Kao Corporation
*9: Sorbitan monolaurate, available from Kao Corporation
*10: Polyoxyethylene lauryl ether, available from Kao Corporation Considering from Table 1 above, it was found that Examples 1 to 9, which are within the scope of the present invention, provide a writing instrument capable of preventing dye deposition to a pen core and highly achieving both inhibition of ink discoloration due to the dye deposition and improved writing feeling without reducing writing performance, as compared with Comparative Examples 1 to 3, which are outside the scope of the present invention.

INDUSTRIAL APPLICABILITY

A writing instrument suitable for felt-tip pens, marking pens, and ballpoint pens is provided.

The invention claimed is:

1. A writing instrument, comprising:
a pen core; and
a water-based ink composition, loaded in the writing instrument,
wherein the water-based ink composition comprises
(i) colored resin particles formed by polymerization of a monomer comprising cyclohexyl (meth)acrylate, the colored resin particles enclosing a basic dye, an oil-soluble dye, or an acid dye, and
(ii) an anionic surfactant.

2. The writing instrument of claim 1, wherein the anionic surfactant is at least one selected from a sulfonic acid-based surfactant, a sulfate ester-based surfactant, and a phosphate ester-based surfactant.

3. The writing instrument of claim 2, wherein the pen core is at least one selected from a polyester core, an acrylic core, a nylon core, a poly(butylene terephthalate) core, a polyethylene core, a rubber core, a urethane core, a polyacetal core, a polypropylene core, a poly(ethylene naphthalate) core, and a poly(ethylene terephthalate) core.

4. The writing instrument of claim 1, wherein the pen core is at least one selected from a polyester core, an acrylic core, a nylon core, a poly(butylene terephthalate) core, a polyethylene core, a rubber core, a urethane core, a polyacetal core, a polypropylene core, a poly(ethylene naphthalate) core, and a poly(ethylene terephthalate) core.

5. The writing instrument of claim 1, wherein the anionic surfactant comprises a sulfonic acid-based surfactant.

6. The writing instrument of claim 1, wherein the anionic surfactant comprises a sulfate ester-based surfactant.

7. The writing instrument of claim 1, wherein the anionic surfactant comprises a phosphate ester-based surfactant.

8. The writing instrument of claim 1, wherein the pen core comprises a polyester.

9. The writing instrument of claim 1, wherein the pen core comprises an acrylic.

10. The writing instrument of claim 1, wherein the pen core comprises a nylon.

11. The writing instrument of claim 1, wherein the pen core comprises a poly(butylene terephthalate).

12. The writing instrument of claim 1, wherein the pen core comprises a polyethylene.

13. The writing instrument of claim 1, wherein the pen core comprises a rubber.

14. The writing instrument of claim 1, wherein the pen core comprises a urethane.

15. The writing instrument of claim 1, wherein the pen core comprises a polyacetal.

16. The writing instrument of claim 1, wherein the pen core comprises a polypropylene.

17. The writing instrument of claim 1, wherein the pen core comprises a poly(ethylene naphthalate).

18. The writing instrument of claim 1, wherein the pen core comprises a poly(ethylene terephthalate).

* * * * *